US008616087B2

(12) United States Patent
Sayama

(10) Patent No.: US 8,616,087 B2
(45) Date of Patent: Dec. 31, 2013

(54) POWER TRANSMISSION DEVICE

(75) Inventor: Masayuki Sayama, Tochigi (JP)

(73) Assignee: GKN Driveline Japan, Ltd., Tochigi (JP)

( * ) Notice: Subject to any disclaimer, the term of this patent is extended or adjusted under 35 U.S.C. 154(b) by 0 days.

(21) Appl. No.: 13/450,372

(22) Filed: Apr. 18, 2012

(65) Prior Publication Data

US 2012/0266704 A1 Oct. 25, 2012

(30) Foreign Application Priority Data

Apr. 20, 2011 (JP) ................. P2011-093820

(51) Int. Cl.
*F16H 37/06* (2006.01)
*F16H 3/38* (2006.01)

(52) U.S. Cl.
USPC .................. 74/661; 74/339; 74/340

(58) Field of Classification Search
USPC ........ 74/661, 664, 665 A–665 D, 665 R, 339, 74/340; 192/48.616–48.619
See application file for complete search history.

(56) References Cited

U.S. PATENT DOCUMENTS

| | | | | |
|---|---|---|---|---|
| 5,194,057 A | * | 3/1993 | Sommer | 475/339 |
| 5,628,234 A | * | 5/1997 | Crook et al. | 74/665 B |
| 6,440,031 B1 | * | 8/2002 | Eberspacher et al. | 475/207 |
| 7,181,989 B2 | * | 2/2007 | Obinata | 74/330 |
| 7,665,376 B2 | * | 2/2010 | Forsyth | 74/330 |
| 7,690,280 B2 | * | 4/2010 | Chapelon et al. | 74/661 |
| 7,891,263 B2 | * | 2/2011 | Mowbray et al. | 74/340 |
| 2003/0217617 A1 | * | 11/2003 | Sakamoto et al. | 74/665 B |
| 2012/0006153 A1 | * | 1/2012 | Imamura et al. | 74/665 A |
| 2012/0132017 A1 | * | 5/2012 | Holder et al. | 74/15.82 |

FOREIGN PATENT DOCUMENTS

| | | | |
|---|---|---|---|
| JP | 2001-097058 A | 4/2001 | |
| WO | WO 2011/018291 A1 | * 2/2011 | F02B 67/04 |

* cited by examiner

*Primary Examiner* — David M Fenstermacher
*Assistant Examiner* — Jake Cook
(74) *Attorney, Agent, or Firm* — Morrison & Foerster LLP

(57) ABSTRACT

A power transmission device is comprised of a first shaft having a first gear and a second gear and capable of being drivingly coupled with the engine; a second shaft drivingly coupled with the electric motor and the first shaft; a third gear meshing with the first gear to form a first gearing having a first gear ratio; a fourth gear coaxial with the third gear, the fourth gear meshing with the second gear to form a second gearing having a second gear ratio; a third shaft coaxial with both the third gear and the fourth gear, the third shaft being drivingly coupled with the axles; a first clutch configured to selectively connect and disconnect the third gear with the third shaft; and a second clutch configured to selectively connect and disconnect the fourth gear with the third shaft.

9 Claims, 2 Drawing Sheets

POWER TRANSMISSION DEVICE

CROSS-REFERENCE TO RELATED APPLICATIONS

This application is based upon and claims the benefit of priority from the prior Japanese Patent Application No. 2011-093820 (filed Apr. 20, 2011); the entire contents of which are incorporated herein by reference.

BACKGROUND OF THE INVENTION

1. Field of the Invention

The present invention relates to a power transmission device preferably used in a vehicle with two or more power sources such as a hybrid vehicle.

2. Description of the Related Art

A hybrid vehicle is typically comprised of an electric motor driven by a battery as well as a combustion engine. While either or both the electric motor and the combustion engine are used to drive the vehicle, the combustion engine is further used for charging the battery. The electric motor can also serve as a generator for generating electricity whereas a hybrid system may be equipped with another generator for use in battery charge.

A driveline for a hybrid vehicle is required not only to mechanically couple these distinct motors with drive axles but also to split power from the combustion engine and then transmit part of the power to the motor/generator(s). Japanese Patent Application Laid-open No. 2001-097058 discloses a related art.

SUMMARY OF THE INVENTION

Structural complexity as described above naturally had made drivelines for hybrid vehicles in the prior art to be larger and heavier than drivelines for conventional vehicles powered only by combustion engines. The heaviness might even spoil fuel efficiency to some degree whereas the fuel efficiency is a prominent advantage of hybrid vehicles.

The present invention has been achieved in view of the aforementioned problem. According to an aspect of the present invention, a power transmission device for transmitting torque among an electric motor, an engine and axles, is comprised of a first shaft having a first gear and a second gear and capable of being drivingly coupled with the engine; a second shaft drivingly coupled with the electric motor and the first shaft; a third gear meshing with the first gear to form a first gearing having a first gear ratio; a fourth gear coaxial with the third gear, the fourth gear meshing with the second gear to form a second gearing having a second gear ratio; a third shaft coaxial with both the third gear and the fourth gear, the third shaft being drivingly coupled with the axles; a first clutch configured to selectively connect and disconnect the third gear with the third shaft; and a second clutch configured to selectively connect and disconnect the fourth gear with the third shaft.

DETAILED DESCRIPTION OF THE PREFERRED EMBODIMENT

Certain embodiments of the present invention will be described hereinafter with reference to the appended drawings.

Figure 1:
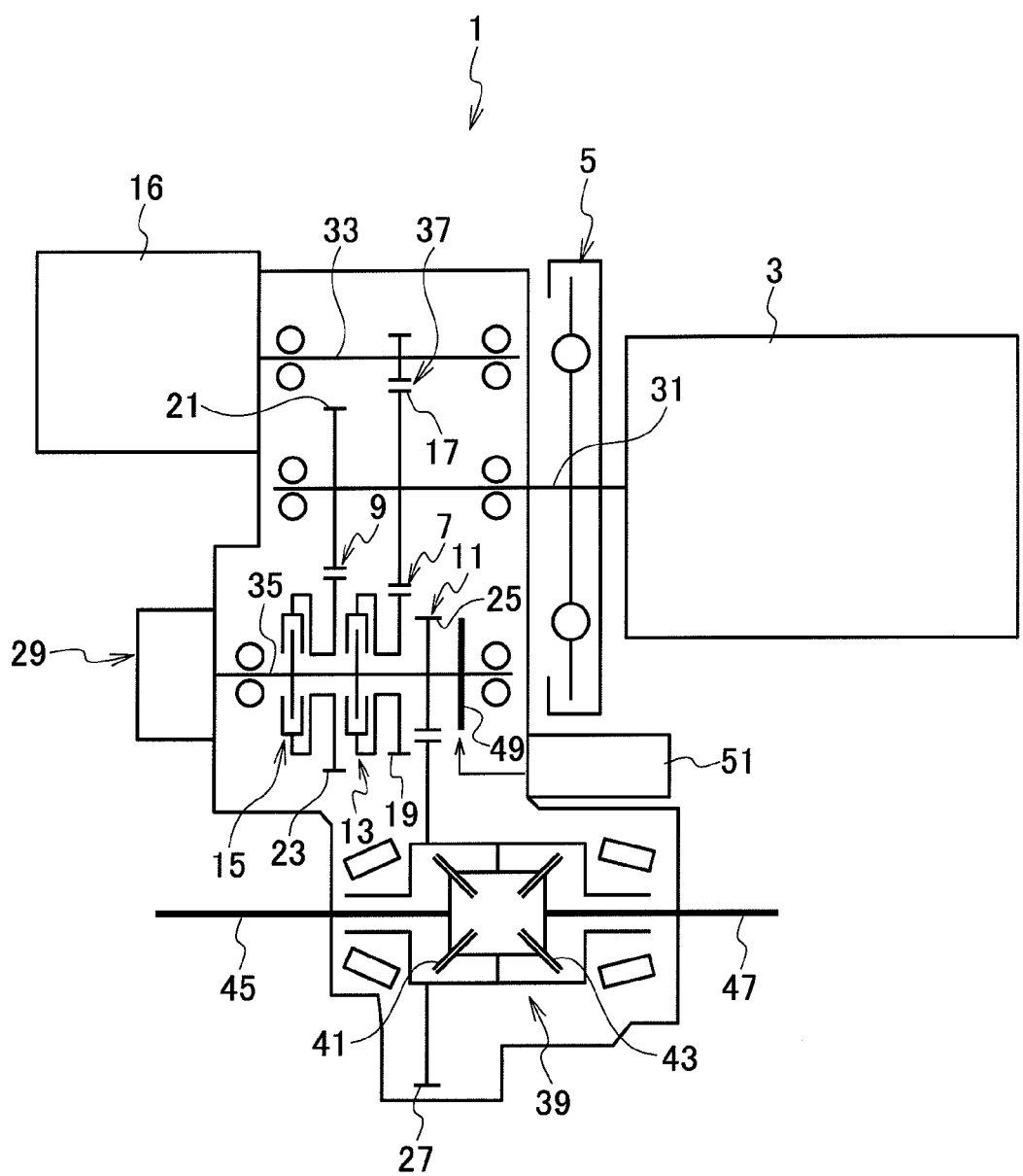
FIG. 1 is a block diagram of a power transmission device according to an embodiment of the present invention.

Referring to FIG. 1, a power transmission device 1 preferably applied to a hybrid vehicle is used for transmitting torque among an engine 3, an electric motor/generator 16 and axles 45,47. The power transmission device 1 is in general comprised of a first shaft 31 capable of being drivingly coupled with the engine 3, a second shaft 33 drivingly coupled with the motor/generator 16, a third shaft 35 for output of transmitted torque, and an output part preferably including a differential 39 for distributing the torque from the third shaft 35 to the left and right axles 45,47.

Between the first shaft 31 and the second shaft 33, mechanical coupling is established by a gear set 37. Between the second shaft 33 and the third shaft 35, a first gearing 7 and a second gearing 9 respectively having distinct gear ratios are provided, although mechanical coupling via the first and second gearings 7,9 is not steadily established.

To controllably connect and disconnect the first gearing 7 with the third shaft 35 provided is a first clutch 13, and to controllably connect and disconnect the second gearing 9 with the third shaft 35 provided is a second clutch 15. The third shaft 35 is steadily coupled with the differential 39 via an output gearing 11. The first and second clutches 13,15 may be installed in connection with the third shaft 35 as shown in the drawing, but may be alternatively installed in connection with the first shaft 31.

Between the engine 3 and the first shaft 31, a clutch 5 may be provided for the purpose of controlling torque transmission from the engine 3 to the first shaft 31. Connection of the clutch 5 enables torque transmission between the engine 3 and the motor/generator 16, thereby enabling battery charge by using the motor/generator 16 as a generator. In contrast, disconnection of the clutch 5 disables torque transmission therebetween.

Further, if either the first clutch 13 or the second clutch 15 is connected, torque transmission to or from the third shaft 35 is enabled. If the clutch 5 is disconnected then, the motor/generator 16 alone drives the axles 45,47 via the differential 39 (EV mode), and can do regenerative braking to recharge the battery. If the clutch 5 is connected then, the engine 3 assists the motor/generator 16 in driving the axles 45,47 (parallel mode).

As the distinct gear ratios are given to the first and second gearings 7,9, the power transmission device 1 can optimize the rotation speed of the first shaft 31 and also the second shaft 33 by properly select which of the first clutch 13 and the second clutch 15 is connected. This configuration is advantageous in improving energy efficiency when the vehicle is cruising and extracting larger torque from the power sources when the vehicle is in a hill-climbing state.

Figure 2:
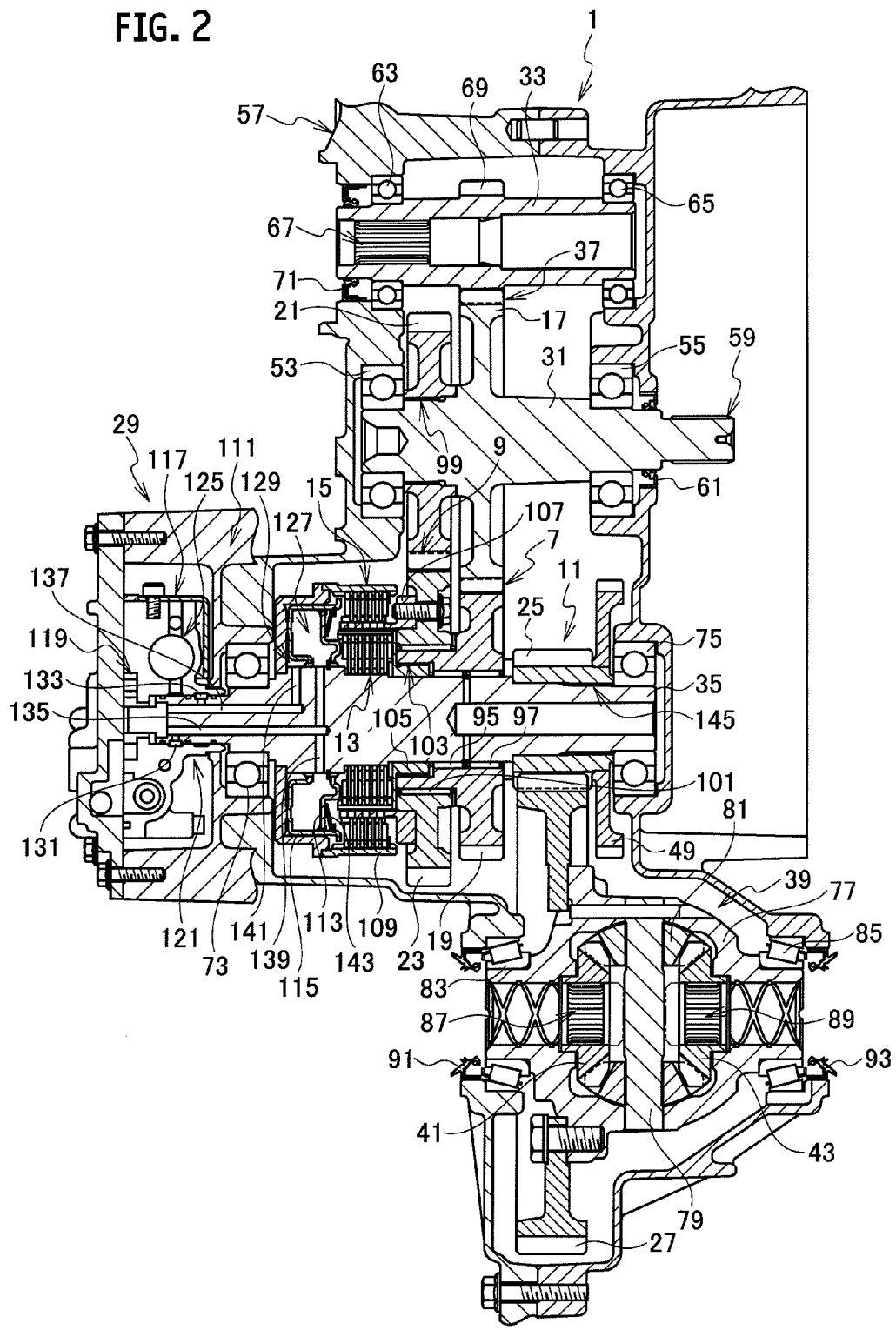
FIG. 2 is a cross sectional view of the power transmission device.

Referring to FIG. 2 in addition, further details will be described hereinafter.

Most members are housed in a casing 57, whereas the engine 3, the clutch 5 and the motor/generator 16 may be disposed outside the casing 57. To seal openings of the casing 57, sealing members or packings 61, 71, 91 and 93 are provided, thereby preventing oil leakage and dust intrusion when installed in a vehicle. The casing 57 may be separable parts which are secured together by means of bolts for convenience of assembly.

The first shaft 31 is rotatably supported by the casing 57 by means of bearings 53,55 at both ends thereof. To the bearings 53,55 applicable are ball bearings, but any other types of bearings may be also applicable thereto. One end of the first shaft 31 may be led out of the casing 57, or alternatively have a hole accessible from the exterior, to form a coupling portion 59, which is preferably splined to engage with the engine 3 and the clutch 5. The packing 61 is provided around the neck of this end.

The first shaft 31 has a first gear 17 and a second gear 21. Diameters of the gears 17,21 are differentiated to give distinct gear ratios. One or both of the gears 17,21 may be formed in a unitary body with the first shaft 31. The rest of gears 17,21 may be formed in a separate body and drivingly coupled with the first shaft 31 by means of a connection portion 99, which may be a spline-connection structure or a key-connection structure for example.

The second shaft 33, preferably in parallel with the first shaft 31, is rotatably supported by the casing 57 by means of bearings 63,65, which are ball bearings for example. The second shaft 33 may be formed in a hollow shape and part 67 of the interior may be splined to engage with the motor/generator 16. Around the end of the second shaft 33 having the part 67, the casing 57 is opened to allow access of the motor/generator 16. Between the opening and the end of the second shaft 33 disposed is the sealing member 71.

The second shaft 33 has a gear 69, which is preferably formed in, but not limited to, a unitary body with the second shaft 33. The gear 69 is so dimensioned as to mesh with one of the first gear 17 and the second gear 21 to form the gear set 37, which transmits torque to and from the first shaft 31. Alternatively, the gear set 37 may be formed as a planetary gear set. In this case, the second shaft 33 along with the motor/generator 16 may be disposed in line with and coaxially with the first shaft 31. Naturally, the second shaft 33 may be directly connected with the first shaft 31 if circumstances about rotation speed allow.

The third shaft 35, preferably in parallel with the first shaft 31 and the second shaft 33, is rotatably supported by the casing 57 by means of bearings 73,75, which are ball bearings for example. Outer peripheries of the third shaft 35 are partly rounded smoothly or comprised of bearings 95,95 such as needle bearings to rotatably support third and fourth gears 19,23, and are partly splined or comprised of key slots to drivingly support clutch plates of the first clutch 13 and gears 25,49.

The third gear 19 meshes with the first gear 17 to form the first gearing 7. The hub portion of the third gear 19 is preferably axially elongated. The elongated hub portion is connected to an outer member 105 of the first clutch 13 preferably via a connection member 103, which is spline-connected or key-connected with an inner periphery of the elongated hub portion. Further the outer periphery of the elongated hub portion rotatably supports the fourth gear 23. Between the third gear 19 and the fourth gear 23 preferably interposed is a needle bearing 101.

The fourth gear 23 meshes with the second gear 21 to form the second gearing 9, which has a distinct gear ratio from that of the first gearing 7 as described already. And gear tooth of the fourth gear 23 is disposed adjacent to the gear tooth of the third gear 19 to minimize the space occupied by the third and fourth gear 19,23.

As being understood from the above description, the third gear 19 is coaxial with the third shaft 35, and is rotatable about the third shaft 35 if the first clutch 13 is disconnected. Similarly, the fourth gear 23 is coaxial with and rotatable about both the third shaft 35 and the third gear 19. The third gear 19 is preferably disposed adjacent to the fourth gear 23. Such is the case with the first gear 7 to the second gear 9. Such arrangement contributes to compactness of the device 1.

An inner member 107 of the second clutch 15 is secured to the fourth gear 23 by means of bolts or any proper fixation means. Alternatively the inner member 107 may be formed in a unitary body with the fourth gear 23. Thus, if the second clutch 15 is connected, mechanical coupling between the fourth gear 23 and the third shaft 35 is established.

The first and second clutches 13,15 may be formed in a multiplate clutch type. The clutches 13,15 may be alternatively in a dog clutch type, a frictional single-plate clutch type, a sleeve clutch type, or any other type. The first and second clutches 13,15 are disposed mutually coaxial. Further the clutches 13,15 mutually overlap as in a nested arrangement to minimize the space. Alternatively, the clutches 13,15 may be disposed in an axially in-line arrangement, which can reduce the radial size.

One set of clutch plates of the first clutch 13 is spline-connected or key-connected with the third shaft 35, and another set is spline-connected or key-connected with the outer member 105 connected to the third gear 19. If pressure is applied to the clutch plates, the first clutch 13 is connected and then transmits torque between the third gear 19 and the third shaft 35.

The second clutch 15 is comprised of a clutch housing 109 drivingly coupled with the third shaft 35, the inner member 107 connected to the fourth gear 23, and clutch plates therebetween. One set of the clutch plates is spline-connected or key-connected with the inner member 107 and another set is spline-connected or key-connected with the clutch housing 109. If pressure is applied to the clutch plates, the second clutch 15 is connected and then transmits torque between the fourth gear 23 and the third shaft 35 via the intervening clutch housing 109.

To selectively connect and disconnect the first clutch 13 and the second clutch 15, an actuator 29 is provided. The actuator 29 is preferably disposed at one end of the third shaft 35 but may be disposed anywhere else.

The actuator 29 is preferably comprised of a hydraulic system 111, a first plunger 113 and a second plunger 115. Whereas any actuation means such as an electromagnetic actuator or an electrically powered gear may be instead applied to the actuator 29, the following exemplary embodiment relates to the hydraulic system 111.

The hydraulic system 111 is comprised of a valve body 117, a hydraulic pump 119, a hydraulic circuit 121, and a reservoir 125.

The hydraulic pump 119 is a type of a geared pump although any proper type can be instead applied thereto. The hydraulic pump 119 is so coupled with the casing 57 and the hydraulic circuit 121 that fluid such as oil used in the casing 57 flows through a strainer back to the hydraulic pump 119 and is then pressurized into the hydraulic circuit 121. To power the hydraulic pump 119, an electric motor not shown in the drawing may be used but any other means may be also applicable.

The reservoir 125 communicates with the hydraulic circuit 121 and thus reserves the pressurized oil. The pressurized oil reserved in the reservoir 125 is in turn supplied to the hydraulic circuit 121 under a stabilized pressure.

In the embodiment, the third shaft 35 is also used as a fluid path for the pressurized oil. The third shaft 35 is preferably comprised of a communication hole 131, an axially elongated path 135 in fluid communication with the hole 131, and one or more radially extending paths 139 in fluid communication with the path 135, so as to supply the pressurized oil to the first plunger 113. Similarly the third shaft 35 is comprised of a communication hole 133 and paths 137,141 so as to supply the pressurized oil to the second plunger 115. Although any other design may be possible, this design is advantageous in its compactness.

The first and second plungers 113,115 are disposed within the clutch housing 109.

The first plunger 113 has an inner end in contact with the outer periphery of the third shaft 35 and an outer end in contact with the second plunger 115. Accordingly the first plunger 113 in combination with the second plunger 115 encloses a chamber. This chamber, as being in fluid communication with the paths 139, serves as a first hydraulic cylinder 127 operated by the hydraulic system 111. Further a proper part of the first plunger 113 projects toward the first clutch 13, thereby applying pressure to the clutch 15 when the second hydraulic cylinder 129 is operated.

The second plunger 115 has an inner end in contact with the outer periphery of the third shaft 35 and an outer end in contact with the inner periphery of the clutch housing 109 to enclose a second hydraulic cylinder 129 in fluid communication with the paths 141. Further the outer end of the second plunger 115 extends toward the second clutch 15, thereby applying pressure to the clutch 15 when the second hydraulic cylinder 129 is operated.

Preferably provided are means for biasing the first and second plungers 113,115 in a direction opposed to the aforementioned operation, such as a return spring 143, for the purpose of disconnection of the plungers 113,115.

Instead of the aforementioned configuration, cylinders or any actuation means may be disposed outside the clutch housing 109, or even outside the casing 57. In this configuration, rods plunging from the cylinders or the actuation means into the clutch housing 109 may be instead provided to actuate the first and second clutches 13,15.

Preferably adjacent to the third and fourth gears 19,23, the third shaft 35 is further comprised of a coupling portion 145, which is splined or has key slots to drivingly connect with the output gear 25. The output gear 25 is so disposed as to mesh with a ring gear 27 as described later to form the output gearing 11. Preferably the output gear 25 is made properly smaller in diameter than the ring gear 27, so the output gearing 11 function as a reduction gear.

These members may, as shown in the drawing, be so arranged that the third gear 19 and the fourth gear 23 are interposed between the output gear 25 and the first and second clutches 13,15. In other words, the clutches 13,15 are at the extremity among these members and the output gear 25 are at the opposite extremity. This arrangement is advantageous in facilitating access of the actuator 29 to the clutches 13,15 and also avoiding biased load on the third shaft 35 because the third gear 19 and the fourth gear 23 are around the center on the third shaft 35. Nevertheless any other arrangements may be possible.

Further, as being connected to the output gear 25 or the coupling portion 145, a parking gear 49 may be provided next to the output gear 25. A parking pawl driven by an actuator 51 may mesh with the gear 47 to lock up the output part. Naturally, a parking gear may be provided at any other proper part.

The differential 39 is comprised of the ring gear 27, a differential casing 77 drivingly coupled with the ring gear 27, a shaft 79 penetrating the casing 77, pinion gears 81 rotatable about the shaft 79, and left and right side gears 41,43 meshing with the pinion gears 81. The differential casing 77 is rotatably supported by casing 57. For such rotatable support, thrust roller bearings 83,85 may be suitable to receive thrust force. The left and right side gears 41, 43 respectively have splined inner peripheries 87,89 to engage with the left and right axles 45,47.

The differential 39 receives the transmitted torque via the ring gear 27 and distribute it to the left and right axles 45,47 with allowing differential motion therebetween. Whereas the differential 39 is illustrated as a bevel gear type, any other type such as an epicyclic type may be instead applicable.

According to the present embodiment, mechanical couplings toward the differential 39 are structured as a single way of the second shaft 33 via the first shaft 31 to the third shaft 35, whereas three pathways are required to interchange torque among the motor/generator 16, the engine 3 and the output axles 45,47. As the number of mechanical couplings is reduced, the power transmission device 1 is constituted in a simple and compact form as compared with the prior art. Moreover the power transmission device 1 enables gear ratio change to optimize the rotation speed whereas the related gears and the actuator are constituted in a compact form. Therefore the present embodiment solves the problem of structural complexity of the prior art.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A power transmission device for transmitting torque among an engine at a first side, an electric motor at a second side opposite to the first side and axles, comprising:
    a first shaft having a first gear, a second gear contiguous to the first gear and led out toward the first side for coupling with the engine;
    a second shaft drivingly coupled with the first shaft and led out toward the second side for coupling with the electric motor;
    a third gear meshing with the first gear to form a first gearing having a first gear ratio;
    a fourth gear coaxial with and contiguous to the third gear and without any clutch intervening between the third gear and the fourth gear, the fourth gear meshing with the second gear to form a second gearing having a second gear ratio;
    a third shaft coaxial with both the third gear and the fourth gear, the third shaft being drivingly coupled with the axles;
    a first clutch configured to selectively connect and disconnect the third gear with the third shaft; and
    a second clutch configured to selectively connect and disconnect the fourth gear with the third shaft,
    wherein both the first clutch and the second clutch are disposed closer to the second side relative to the third gear and the fourth gear.

2. The power transmission device of claim 1, wherein the third shaft includes an output gear drivingly connected with the third shaft and so arranged that the third gear and the fourth gear are interposed between the output gear and the first and second clutches.

3. The power transmission device of claim 1, wherein the first clutch is disposed coaxial and overlaps with the second clutch.

4. The power transmission device of claim 1, wherein the first clutch and the second clutch are disposed coaxial with the third shaft.

5. The power transmission device of claim 1, wherein the first clutch is drivingly coupled with the third shaft, whereby the first clutch enables torque transmission between the third gear and the third shaft when the first clutch is connected.

6. The power transmission device of claim 1, further comprising:
   a clutch housing drivingly coupled with the third shaft and the second clutch, whereby the clutch housing mediates torque transmission between the fourth gear and the third shaft when the second clutch is connected.

7. The power transmission device of claim 6, further comprising:
   a second plunger configured to actuate the second clutch, the second plunger is so disposed as to, in combination with the clutch housing, enclose a second hydraulic cylinder;
   a first plunger configured to actuate the first clutch, the first plunger is so disposed as to, in combination with the second plunger, enclose a first hydraulic cylinder; and
   a hydraulic pump configured to supply a fluid to the first hydraulic cylinder and the second hydraulic cylinder.

8. The power transmission device of claim 1, further comprising:
   a gear set interposed between the first shaft and the second shaft to establish mechanical coupling.

9. The power transmission device of claim 1, further comprising:
   an output gearing drivingly coupled with the third shaft to transmit torque to the axles, the output gearing being disposed between the engine and the electric motor.

\* \* \* \* \*